(12) United States Patent
Zhao et al.

(10) Patent No.: US 12,392,690 B1
(45) Date of Patent: Aug. 19, 2025

(54) AUTOMATIC SAMPLE PREPARATION DEVICE FOR SAMPLING FILTER MEMBRANES OF AMBIENT AIR PARTICULATE MATTER

(71) Applicant: China National Environmental Monitoring Center, Beijing (CN)

(72) Inventors: Shuli Zhao, Beijing (CN); Mao Yuan, Beijing (CN); Chao Wang, Beijing (CN); Jinlong Yang, Beijing (CN); Jing Zhang, Beijing (CN)

(73) Assignee: China National Environmental Monitoring Center, Beijing (CN)

( * ) Notice: Subject to any disclaimer, the term of this patent is extended or adjusted under 35 U.S.C. 154(b) by 0 days.

(21) Appl. No.: 19/074,273

(22) Filed: Mar. 7, 2025

(30) Foreign Application Priority Data

Apr. 24, 2024 (CN) .......................... 202410495375.3

(51) Int. Cl.
*G01N 1/22* (2006.01)
*G01N 1/40* (2006.01)

(52) U.S. Cl.
CPC ......... *G01N 1/2205* (2013.01); *G01N 1/4077* (2013.01); *G01N 2001/4088* (2013.01)

(58) Field of Classification Search
CPC .. G01N 1/2205; G01N 1/4077; G01N 1/2273; G01N 2001/4088
USPC ...................................................... 73/863.23
See application file for complete search history.

(56) References Cited

FOREIGN PATENT DOCUMENTS

| | | | |
|---|---|---|---|
| CN | 201508291 U | | 6/2010 |
| CN | 206661346 U | * | 11/2017 |
| CN | 211627099 U | * | 10/2020 |
| CN | 214749195 U | | 11/2021 |
| CN | 215574077 U | * | 1/2022 |
| CN | 217277202 U | | 8/2022 |
| CN | 220143598 U | | 12/2023 |
| CN | 220339784 U | | 1/2024 |
| CN | 220650148 U | | 3/2024 |
| WO | 2022120971 A1 | | 6/2022 |

\* cited by examiner

*Primary Examiner* — Laura Martin
*Assistant Examiner* — Nashmiya S Fayyaz (57) ABSTRACT

Disclosed is an automatic sample preparation device for sampling filter membranes of ambient air particulate matter. The device includes an air particulate matter sampler and a cutter, where the cutter includes a second conical tube. The second conical tube is provided with an air inlet and a sliding groove, a mounting frame is arranged on the second conical tube, sliding rods are arranged on the mounting frame, a sliding block is arranged on either of the sliding rods, and an elliptical frame is arranged on the two sliding blocks. A traction plate is arranged on the elliptical frame, a traction rod is arranged on the traction plate, a screening box is arranged on the traction rod, and the screening box and the sliding groove are arranged. A drainage block is arranged on the screening box, a discharging block is arranged on the drainage block, and screening holes are formed.

5 Claims, 5 Drawing Sheets

AUTOMATIC SAMPLE PREPARATION DEVICE FOR SAMPLING FILTER MEMBRANES OF AMBIENT AIR PARTICULATE MATTER

CROSS-REFERENCE TO RELATED APPLICATION

This application claims priority of Chinese Patent Application No. 202410495375.3, filed on Apr. 24, 2024, the entire contents of which are incorporated herein by reference.

TECHNICAL FIELD

The present disclosure relates to the field of atmospheric particle samplers, and particularly relates to an automatic sample preparation device for sampling filter membranes of ambient air particulate matter.

BACKGROUND

Atmospheric particle samplers are instruments or devices for collecting atmospheric pollutants or polluted atmosphere. Atmospheric samplers are various in types and can be divided into gas (including steam) samplers and particle samplers according to collection objects, and can be further divided into environmental samplers, indoor samplers (such as samplers used in factory workshops) and pollution source samplers (such as chimney samplers) according to application scenarios. In addition, there are special-purpose atmospheric samplers, such as samplers configured to simultaneously capture gaseous pollutants and particulate matter such as sulfur dioxide and particle matter in the atmosphere, or hydrogen fluoride and particle matter and the like, which facilitates study of the relationship between sulfur and fluorine in gaseous and solid substances. There are also samplers for collecting bacteria in the air, and inertial cutters for atmospheric particle sampling are mainly used to separate particles of different sizes such that collected samples are representative. It is because particles in the atmosphere are very various in sizes, and particles of different sizes have different effects on health and environments. In order to better study compositions and sources of atmospheric particles, it is necessary to sample and analyze particles of different sizes. The inertial cutters function to separate atmospheric particles collected by the samplers according to particle sizes, which facilitates subsequent particle analysis and research.

However, atmospheric particle samplers of the prior art still have the following defects in use:

An atmospheric particulate sampler of the prior art is inconveniently cleaned because winged insects, flying catkins and the like in the air easily enter the sampler during outdoor sampling, and sampling accuracy is not high because the winged insects and flying catkins are larger than the air particulate matter and easily block a filter net of a sampling opening, and foreign matter on the filter net easily enters the sampling opening through the filter net, such that operation is time-consuming and labor-consuming, and the sampler needs to be shut down, thereby affecting normal collection of air particulate matter. Therefore, it is very necessary to provide an automatic sample preparation device for sampling filter membranes of ambient air particulate matter that can be applied to the field of atmospheric particle samplers of the prior art.

SUMMARY

An atmospheric particulate sampler of the prior art is inconveniently cleaned because winged insects, flying catkins and the like in the air easily enter the sampler during outdoor sampling, and sampling accuracy is not high because the winged insects and flying catkins are larger than the air particulate matter and easily block a filter net of a sampling opening, and foreign matter on the filter net easily enters the sampling opening through the filter net, such that operation is time-consuming and labor-consuming, and the sampler needs to be shut down, thereby affecting normal collection of air particulate matter. In order to overcome the defects in the prior art, the present disclosure provides an automatic sample preparation device for sampling filter membranes of ambient air particulate matter.

A technical solution adopted by the present disclosure to solve the above technical problems is as follows: An automatic sample preparation device for sampling filter membranes of ambient air particulate matter, including an air particulate matter sampler and a cutter, where the cutter includes a second conical tube; an upper surface of the second conical tube is provided with an air inlet, the air inlet is communicated with inside of the second conical tube, an inner top surface of the second conical tube is provided with a sliding groove, the sliding groove is located outside the air inlet, and a mounting frame is fixedly arranged on an arc-shaped surface of the second conical tube; sliding rods are symmetrically and fixedly arranged on an inner wall of the mounting frame, a sliding block is movably arranged on either of the sliding rods, an elliptical frame is fixedly arranged on tops of the two sliding blocks, and the elliptical frame is located above the mounting frame; a traction plate is fixedly arranged on the elliptical frame, and a traction rod is fixedly arranged on the traction plate, where one end of the traction rod movably penetrates inside of the second conical tube, a screening box is fixedly arranged at the other end of the traction rod, and the screening box and the sliding groove are movably arranged; and the air inlet is located above the screening box, a drainage block is fixedly arranged on a side surface of the screening box, and a discharging block is fixedly arranged at an end of the drainage block, where the drainage block is triangular, the drainage block is tilted downward in a direction of facing the discharging block, and screening holes are formed in the screening box.

Preferably, traction racks are fixedly arranged on symmetrical inner walls of the elliptical frame, a fixing frame is fixedly arranged at a bottom of the mounting frame, and an operating motor is fixedly arranged on the fixing frame, where a rotating rod is fixedly arranged at an output end of the operating motor, and the rotating rod movably penetrates the fixing frame; and a sector gear is fixedly arranged on a top of the fixing frame, the sector gear is located between the two traction racks, and the sector gear is in toothed engagement with only one of the traction racks separately.

Preferably, a traction tube is fixedly arranged on the second conical tube, a vertical block is fixedly arranged at one end of the traction tube, the vertical block is located inside the second conical tube, and a vertical tube is fixedly arranged at the other end of the traction tube, where the vertical tube is located on one side of the second conical tube, and the traction tube is tilted upward in a direction of facing the vertical block; and an internal threaded cap is fixedly arranged at a bottom of the vertical tube, and a collecting bottle is threadedly arranged on the internal threaded cap.

Preferably, a placing opening is formed on a top of the vertical block, the placing opening is communicated with inside of the vertical block, and inner cavities are symmetrically arranged on the vertical block, where the inner cavities are located on both sides of the placing opening; a mounting tube is fixedly arranged on either of the inner cavities, an insertion rod is movably arranged at an end of either of the mounting tubes, and an end of the insertion rod moves inside the mounting tube; and a shielding block is fixedly arranged at an end of either of the insertion rods, the shielding block movably penetrates the placing opening, a telescopic spring is arranged on the mounting tube and the insertion rod, and both ends of the telescopic spring are fixedly arranged together with the inner cavity and the shielding block respectively.

Preferably, the discharging block is located in the placing opening, and symmetrical side surfaces of the discharging block are respectively fitted with the shielding blocks.

Preferably, an internal threaded tube is fixedly arranged on the air particulate matter sampler, a threaded operating tube is fixedly arranged at a bottom of an assembly tube, the threaded operating tube is threadedly engaged with the internal threaded tube, a connecting tube is fixedly arranged on a top of the assembly tube, a first conical tube is fixedly arranged on a top of the connecting tube, a threaded sleeve is fixedly arranged on the first conical tube, and a filter membrane sheet is arranged on an inner wall of the first conical tube.

Preferably, a threaded cover is threadedly arranged on the threaded sleeve, and a filter membrane clamp is fixedly arranged on an inner wall of the threaded cover, where the threaded sleeve is located on an outer side of the filter membrane clamp, and a bottom of the filter membrane clamp is fitted with a surface of the filter membrane sheet; and a communicating pipe is fixedly arranged on a top of the threaded cover, a top of the communicating pipe is fixedly arranged together with a bottom of the second conical tube, a connecting rod is fixedly arranged on a top of the second conical tube, and a shielding plate is fixedly arranged on a top of the connecting rod.

Preferably, guide plates are symmetrically and fixedly arranged on an inner wall of the second conical tube, one end of either of the two guide plates is fixedly arranged, and the other end of either the two guide plates is tilted downward outward; a mounting frame is fixedly arranged at a bottom of either of the two guide plates, a rotating rod is movably arranged on the mounting frame, and the rotating rod is located inside the communicating pipe and the threaded cover; and a plurality of push plates are fixedly arranged on the rotating rod, and the push plates are close to the filter membrane sheet.

Preferably, a first equal-diameter bevel gear is fixedly arranged on a top of the rotating rod, and a movable rod is movably arranged on the second conical tube; a second equal-diameter bevel gear is fixedly arranged at one end of the movable rod, the second equal-diameter bevel gear is located below the guide plates, and the second equal-diameter bevel gear is in toothed engagement with the first equal-diameter bevel gear; and a third equal-diameter bevel gear is fixedly arranged at the other end of the movable rod, a fourth equal-diameter bevel gear is fixedly arranged on the rotating rod, and the fourth equal-diameter bevel gear is in toothed engagement with the third equal-diameter bevel gear.

The present disclosure has the beneficial effects as follows:

1. In the present disclosure, the air particulate matter sampler generates a suction force to draw external air through the air inlet, and flying catkins and winged insects may enter the screening box. When the operating motor is activated, the rotating rod drives the sector gear to rotate, such that the sector gear is in toothed engagement with only one of the traction racks. The elliptical frame moves on the sliding rods through the sliding blocks in a reciprocating manner, such that the traction plate drives the traction rod to move on the second conical tube, and the screening box screens air particulate matter, flying catkins, winged insects and the like. Air particulate matter with small sizes is screened out, while the flying catkins, winged insects and the like with larger sizes enter the vertical block through the drainage block and the discharging block. The discharging block moves on the placing opening, such that one end of the insertion rod moves inside the mounting tube, and the telescopic spring is extended and retracted to prevent the flying catkins, winged insects and the like from re-entering the inside of the second conical tube. Finally, the flying catkins, winged insects and the like fall into the collecting bottle through the traction tube and the vertical tube for collection. The air particulate matter is adsorbed into the communicating pipe through the second conical tube, and then enters the first conical tube through the second conical tube, and the filter membrane sheet adsorbs the air particulate matter, which facilitates removal of the particulate matter on the filter membrane sheet for analysis and research, thereby improving an operating effect.

2. The present disclosure enables to dispose flying catkins, winged insects and the like without need to disassemble the cutter, and only the collecting bottle needs to be disassembled, thereby improving work efficiency.

3. In the present disclosure, air particulate matter falls into the communicating pipe through inclined surfaces of the guide plates, when the operating motor is activated, the rotating rod drives the fourth equal-diameter bevel gear to rotate, the fourth equal-diameter bevel gear drives the third equal-diameter bevel gear to rotate, the third equal-diameter bevel gear drives the second equal-diameter bevel gear to rotate through the movable rod, the second equal-diameter bevel gear drives the first equal-diameter bevel gear to rotate, such that the first equal-diameter bevel gear drives the push plates to rotate through the rotating rod, and the push plates push the unevenly distributed air particulate matter, such that the air particulate matter is evenly distributed on the filter membrane sheet, which facilitates delivery of an ideal sample for scanning electron microscopy.

BRIEF DESCRIPTION OF THE DRAWINGS

In order to more clearly illustrate technical solutions in the examples of the present disclosure or in the prior art, a brief introduction to the drawings required for the examples or the description of the prior art will be provided below. Obviously, the drawings in the following description are only some of the examples of the present disclosure, and those of ordinary skill in the art would also be able to derive other drawings from these drawings without making creative efforts.

Reference numerals in the figures: 10—air particulate matter sampler, 11—assembly tube, 12—internal threaded tube, 13—sector gear, 20—threaded operating tube, 21—connecting tube, 22—first conical tube, 23—threaded cover, 30—communicating pipe, 31—second conical tube, 32—mounting frame, 33—traction plate, 40—traction rod, 41—connecting rod, 42—shielding plate, 43—traction tube, 50—vertical tube, 51—internal threaded cap, 52—collecting bottle, 53—air inlet, 60—sliding groove, 61—guide plate, 62—mounting frame, 63—rotating rod, 70—first equal-diameter bevel gear, 71—movable rod, 72—second equal-diameter bevel gear, 73—third equal-diameter bevel gear, 74—rotating rod, 75—fourth equal-diameter bevel gear, 76—sliding rod, 80—push plate, 81—filter membrane clamp, 82—filter membrane sheet, 83—threaded sleeve, 84—screening box, 85—screening hole, 86—drainage block, 87—discharging block, 88—fixing frame, 89—operating motor, 90—vertical block, 91—placing opening, 92—inner cavity, 93—mounting tube, 94—insertion rod, 95—shielding block, 96—telescopic spring, 97—sliding block, 98—elliptical frame, and 99—traction rack.

DETAILED DESCRIPTIONS OF THE EMBODIMENTS

The technical solutions in the examples of the present disclosure will be described clearly and completely with reference to the accompanying drawings in the examples of the present disclosure. It is obvious that the examples described are merely some examples rather than all examples of the present disclosure. All other examples acquired by those of ordinarily skilled in the art without making creative efforts based on the examples of the present disclosure fall within the scope of protection of the present disclosure.

Example 1

FIGS. 1-6 are schematic structural diagrams of an automatic sample preparation device for sampling filter membranes of ambient air particulate matter in a preferred embodiment of the present disclosure. With reference to FIGS. 3-6, the automatic sample preparation device for sampling filter membranes of ambient air particulate matter includes an air particulate matter sampler 10 and a cutter, where the cutter includes a second conical tube 31. An upper surface of the second conical tube 31 is provided with an air inlet 53 that is communicated with inside of the second conical tube 31, an inner top surface of the second conical tube 31 is provided with a sliding groove 60 located outside the air inlet 53, and a mounting frame 32 is fixedly arranged on an arc-shaped surface of the second conical tube 31. Sliding rods 76 are symmetrically and fixedly arranged on an inner wall of the mounting frame 32, a sliding block 97 is movably arranged on either of the sliding rods 76, and an elliptical frame 98 is fixedly arranged on tops of the two sliding blocks 97. Traction racks 99 are fixedly arranged on symmetrical inner walls of the elliptical frame 98, a fixing frame 88 is fixedly arranged at a bottom of the mounting frame 32, and an operating motor 89 is fixedly arranged on the fixing frame 88, where a rotating rod 74 is fixedly arranged at an output end of the operating motor 89, and the rotating rod 74 movably penetrates the fixing frame 88. A sector gear 13 is fixedly arranged on a top of the fixing frame 88, the sector gear 13 is located between the two traction racks 99, and the sector gear 13 is in toothed engagement with only one of the traction racks 99 separately. A traction plate 33 is fixedly arranged on the elliptical frame 98, and a traction rod 40 is fixedly arranged on the traction plate 33, where one end of the traction rod 40 movably penetrates inside of the second conical tube 31, and a screening box 84 that moves in the sliding groove 60 is fixedly arranged at the other end of the traction rod 40. The air inlet 53 is located above the screening box 84, a drainage block 86 is fixedly arranged on a side surface of the screening box 84, and a discharging block 87 is fixedly arranged at an end of the drainage block 86, where the drainage block 86 is triangular, and the drainage block 86 is tilted downward in a direction of facing the discharging block 87. Screening holes 85 are formed in the screening box 84, a traction tube 43 is fixedly arranged on the second conical tube 31, a vertical block 90 located inside the second conical tube 31 is fixedly arranged at one end of the traction tube 43, and a vertical tube 50 is fixedly arranged at the other end of the traction tube 43, where the vertical tube 50 is located on one side of the second conical tube 31, and the traction tube 43 is tilted upward in a direction of facing the vertical block 90. An internal threaded cap 51 is fixedly arranged at a bottom of the vertical tube 50, a collecting bottle 52 is threadedly arranged on the internal threaded cap 51, a placing opening 91 communicated with inside of the vertical block 90 is formed on a top of the vertical block 90, and inner cavities 92 are symmetrically arranged on the vertical block 90, where the inner cavities 92 are located on both sides of the placing opening 91. A mounting tube 93 is fixedly arranged on either of the inner cavities 92, an insertion rod 94 is movably arranged at an end of either of the mounting tubes 93, and an end of the insertion rod 94 moves inside the mounting tube 93. A shielding block 95 is fixedly arranged at an end of either of the insertion rods 94, the shielding block 95 movably penetrates the placing opening 91, and a telescopic spring 96 is fixedly arranged between the inner cavity 92 and the shielding block 95, where the mounting tube 93 and the insertion rod 94 are arranged on an inner side of the telescopic spring 96. The discharging block 87 is located in the placing opening 91, and symmetrical side surfaces of the discharging block 87 are respectively fitted with the shielding blocks 95. The air particulate matter sampler 10 generates a suction force to draw external air through the air inlet 53, and flying catkins and winged insects may enter the screening box 84. When the operating motor 89 is activated, the rotating rod 74 drives the sector gear 13 to rotate, such that the sector gear 13 is in toothed engagement with only one of the traction racks 99. The elliptical frame 98 moves on the sliding rods 76 through the sliding blocks 97 in a reciprocating manner, such that the traction plate 33 drives the traction rod 40 to move on the second conical tube 31, and the screening box 84 screens air particulate matter, flying catkins, winged insects and the like. Air particulate matter with small sizes is screened out, while the flying catkins, winged insects and the like with larger sizes enter the vertical block 90 through the drainage block 86 and the discharging block 87. The discharging block 87 moves on the placing opening 91, such that one end of the insertion rod 94 moves inside the mounting tube 93, and the telescopic spring 96 is extended and retracted to prevent the flying catkins, winged insects and the like from re-entering the inside of the second conical tube 31. Finally, the flying catkins, winged insects and the like fall into the collecting bottle 52 through the traction tube 43 and the vertical tube 50 for collection.

Figure 1:
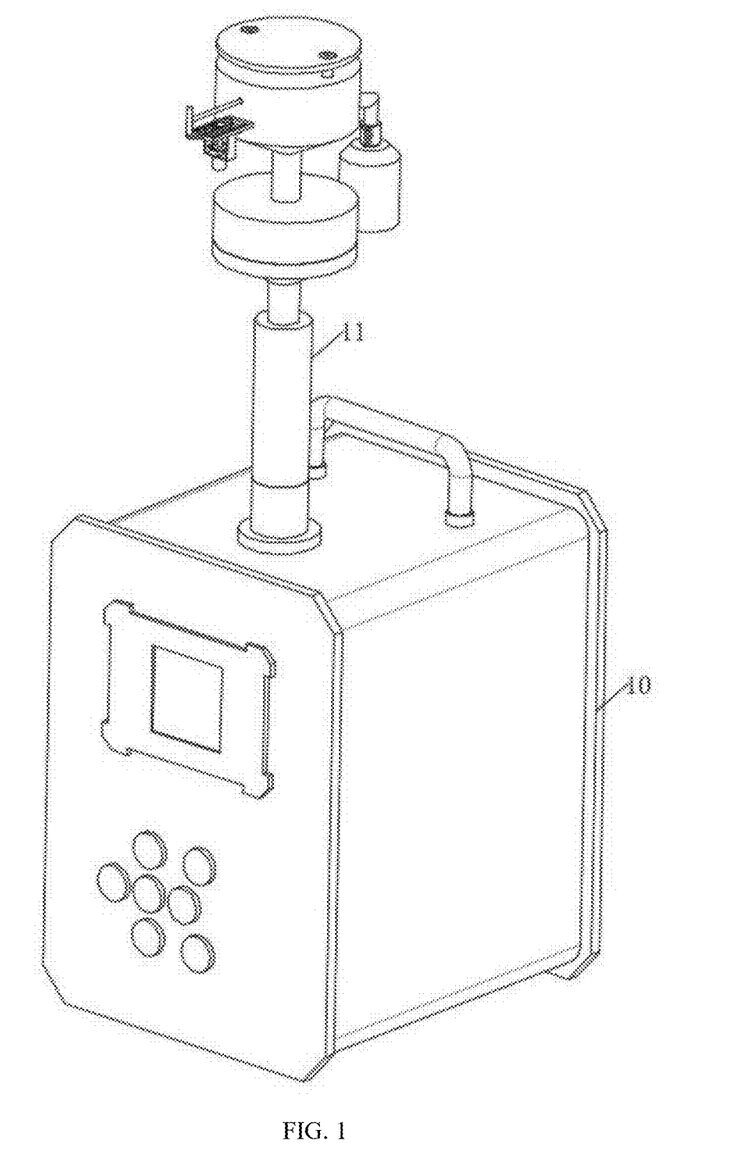
FIG. 1 is a schematic diagram of an assembly structure of an air particulate matter sampler and a cutter of the present disclosure.
Figure 2:
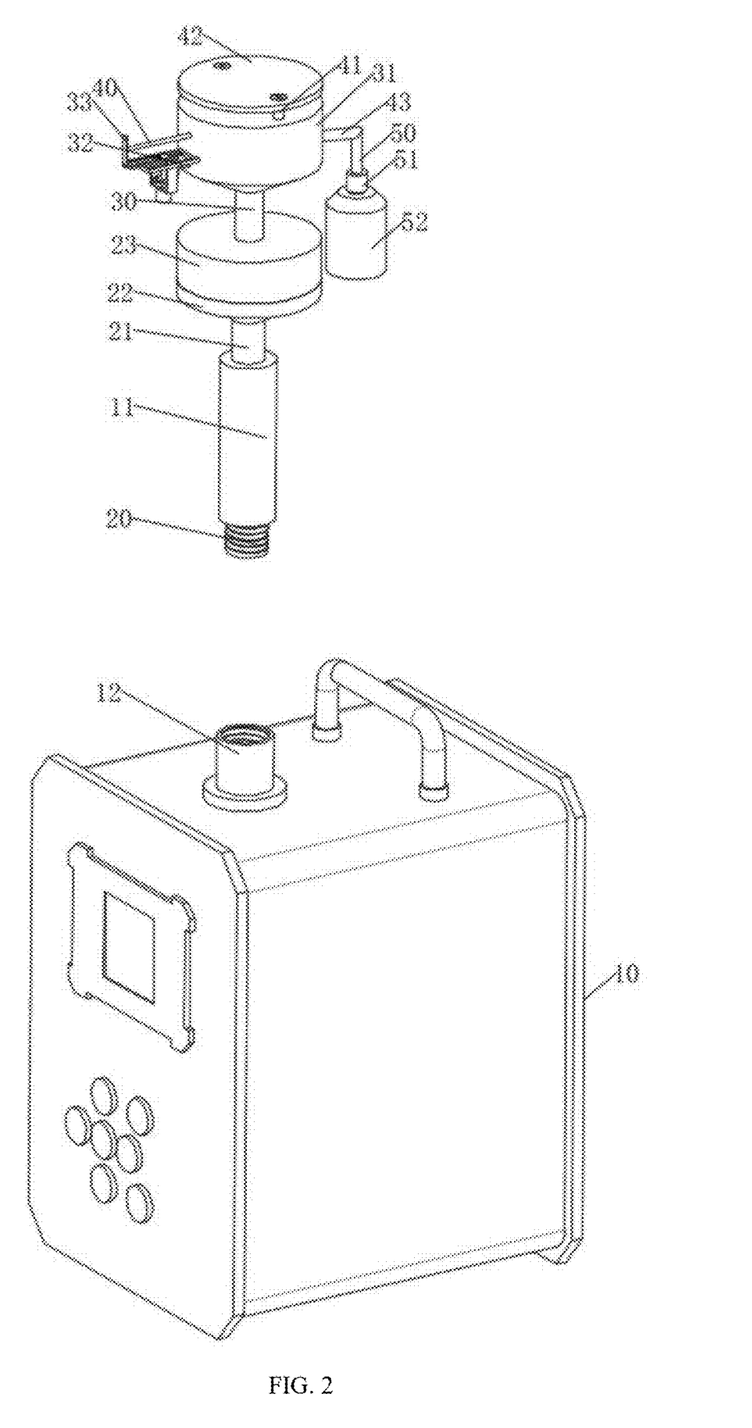
FIG. 2 is a schematic diagram of a breakdown structure of an air particulate matter sampler and a cutter of the present disclosure.
Figure 3:
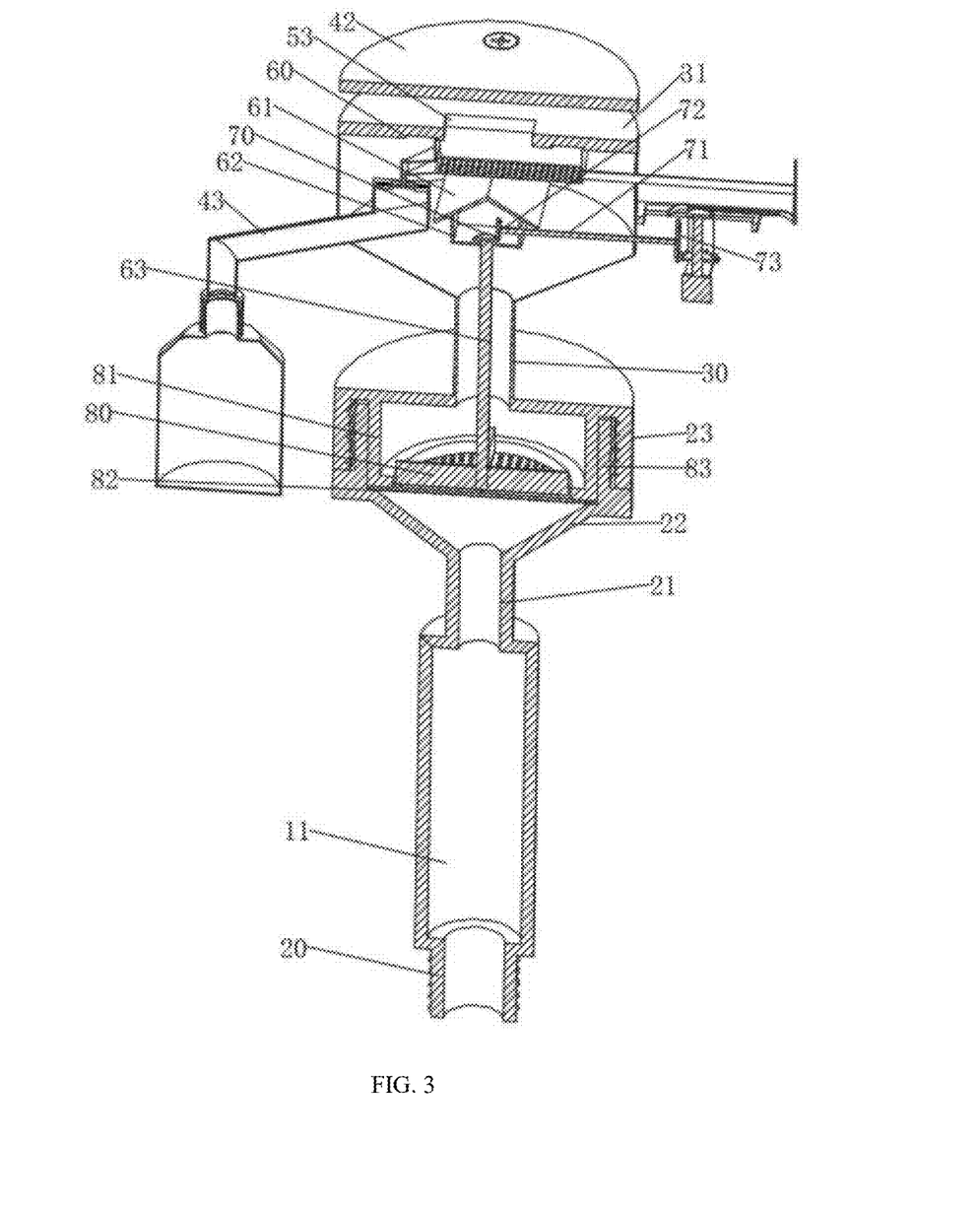
FIG. 3 is a schematic diagram of a sectional structure of a cutter of the present disclosure.
Figure 4:
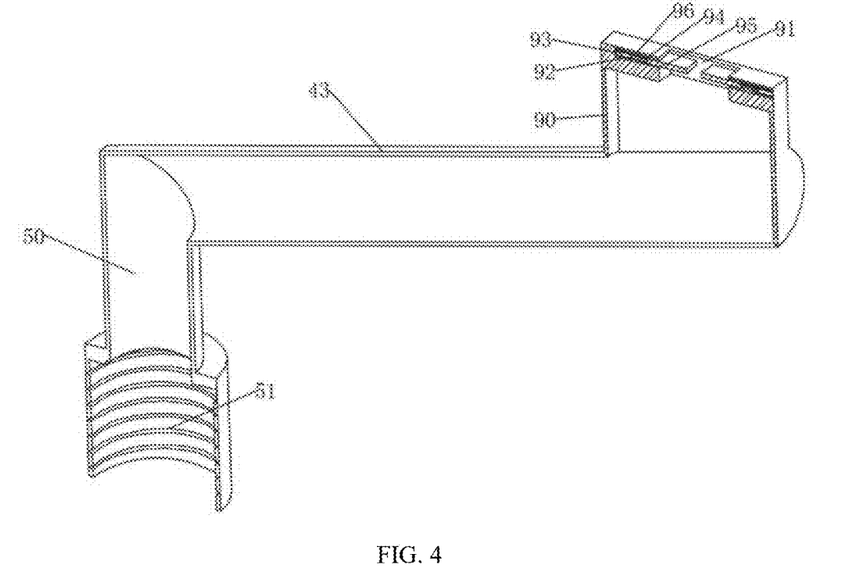
FIG. 4 is a sectional view of an adjustment mechanism of the present disclosure.

With reference FIGS. 1-3, an internal threaded tube 12 is fixedly arranged on the air particulate matter sampler 10, a threaded operating tube 20 that is threadedly engaged with the internal threaded tube 12 is fixedly arranged at a bottom of an assembly tube 11, a connecting tube 21 is fixedly arranged on a top of the assembly tube 11, a first conical tube 22 is fixedly arranged on a top of the connecting tube 21, a threaded sleeve 83 is fixedly arranged on the first conical tube 22, a filter membrane sheet 82 is arranged on an inner wall of the first conical tube 22, a threaded cover 23 is threadedly arranged on the threaded sleeve 83, and a filter membrane clamp 81 is fixedly arranged on an inner wall of the threaded cover 23, where the threaded sleeve 83 is located on an outer side of the filter membrane clamp 81, and a bottom of the filter membrane clamp 81 is fitted with a surface of the filter membrane sheet 82. A communicating pipe 30 is fixedly arranged on a top of the threaded cover 23, a top of the communicating pipe 30 is fixedly arranged together with a bottom of the second conical tube 31, a connecting rod 41 is fixedly arranged on a top of the second conical tube 31, and a shielding plate 42 is fixedly arranged on a top of the connecting rod 41. The air particulate matter is adsorbed into the communicating pipe 30 through the second conical tube 31, and then enters the first conical tube 22 through the second conical tube 31, and the filter membrane sheet 82 adsorbs the air particulate matter, which facilitates removal of the particulate matter on the filter membrane sheet 82 for analysis and research.

Working principle: The air particulate matter sampler 10 generates a suction force to draw external air through the air inlet 53, and flying catkins and winged insects may enter the screening box 84. When the operating motor 89 is activated, the rotating rod 74 drives the sector gear 13 to rotate, such that the sector gear 13 is in toothed engagement with only one of the traction racks 99. The elliptical frame 98 moves on the sliding rods 76 through the sliding blocks 97 in a reciprocating manner, such that the traction plate 33 drives the traction rod 40 to move on the second conical tube 31, and the screening box 84 screens air particulate matter, flying catkins, winged insects and the like. Air particulate matter with small sizes are screened out, while the flying catkins, winged insects and the like with larger sizes enter the vertical block 90 through the drainage block 86 and the discharging block 87. The discharging block 87 moves on the placing opening 91, such that one end of the insertion rod 94 moves inside the mounting tube 93, and the telescopic spring 96 is extended and retracted to prevent the flying catkins, winged insects and the like from re-entering the inside of the second conical tube 31. Finally, the flying catkins, winged insects and the like fall into the collecting bottle 52 through the traction tube 43 and the vertical tube 50 for collection. The air particulate matter is adsorbed into the communicating pipe 30 through the second conical tube 31, and then enters the first conical tube 22 through the second conical tube 31, and the filter membrane sheet 82 adsorbs the air particulate matter, which facilitates removal of the particulate matter on the filter membrane sheet 82 for analysis and research, thereby improving an operating effect.

Example 2

Figure 5:
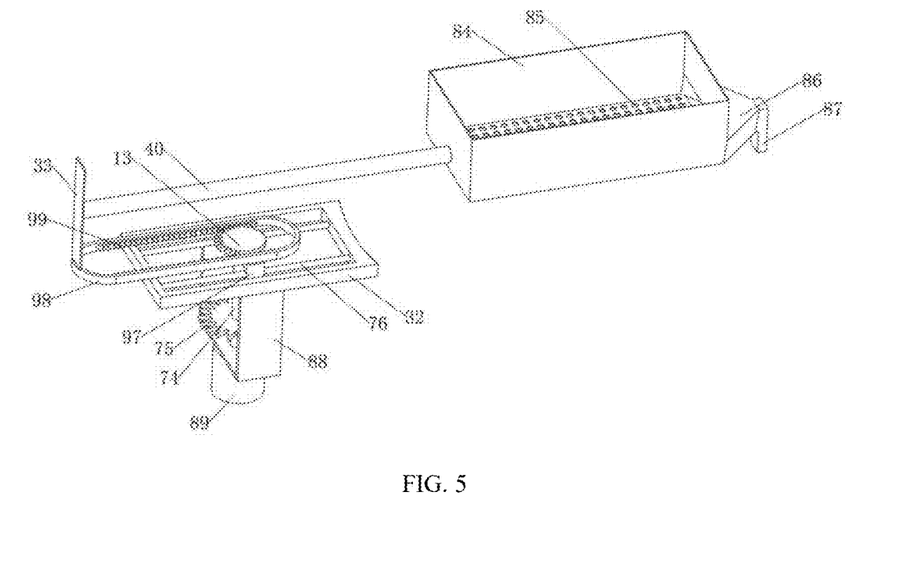
FIG. 5 is a schematic diagram of a traction mechanism of the present disclosure.
Figure 6:
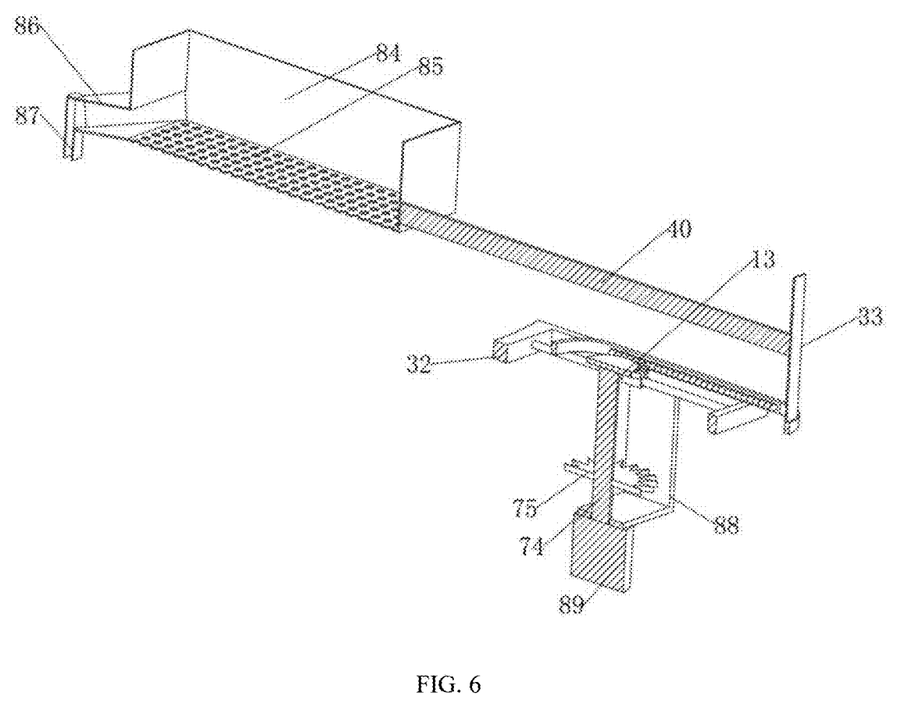
FIG. 6 is a sectional view of a traction mechanism of the present disclosure.

FIGS. 3, 5 and 6 are schematic structural diagrams of an automatic sample preparation device for sampling filter membranes of ambient air particulate matter in another preferred embodiment of the present disclosure. Active sampling aims to achieve rapid collection of particulate matter by air pumping. However, at present, there exist many problems including uneven distribution of particulate matter on the filter membrane sheet 82 during sampling, and difficulty to provide an ideal sample for scanning electron microscopy. Therefore, the device is improved on the basis of Example 1. Specifically, guide plates 61 are symmetrically and fixedly arranged on an inner wall of the second conical tube 31, the guide plates 61 are located below the screening box 84, one end of either of the two guide plates 61 is fixedly arranged, and the other end of either the two guide plates 61 is tilted downward outward. A mounting frame 62 is fixedly arranged at a bottom of either of the two guide plates 61, a rotating rod 63 is movably arranged on the mounting frame 62, and the rotating rod 63 is located inside the communicating pipe 30 and the threaded cover 23. Further, a plurality of push plates 80 close to the filter membrane sheet 82 are fixedly arranged on the rotating rod 63, a first equal-diameter bevel gear 70 is fixedly arranged on a top of the rotating rod 63, and a movable rod 71 is movably arranged on the second conical tube 31. A second equal-diameter bevel gear 72 that is in toothed engagement with the first equal-diameter bevel gear 70 is fixedly arranged at one end of the movable rod 71, the second equal-diameter bevel gear 72 is located below the guide plates 61, a third equal-diameter bevel gear 73 is fixedly arranged at the other end of the movable rod 71, and a fourth equal-diameter bevel gear 75 that is in toothed engagement with the third equal-diameter bevel gear 73 is fixedly arranged on the rotating rod 74.

Working principle: air particulate matter falls into the communicating pipe 30 through inclined surfaces of the guide plates 61, when the operating motor 89 is activated, the rotating rod 74 drives the fourth equal-diameter bevel gear 75 to rotate, the fourth equal-diameter bevel gear 75 drives the third equal-diameter bevel gear 73 to rotate, the third equal-diameter bevel gear 73 drives the second equal-diameter bevel gear 72 to rotate through the movable rod 71, the second equal-diameter bevel gear 72 drives the first equal-diameter bevel gear 70 to rotate, such that the first equal-diameter bevel gear 70 drives the push plates 80 to rotate through the rotating rod 63, and the push plates 80 push the unevenly distributed air particulate matter, such that the air particulate matter is evenly distributed on the filter membrane sheet 82, which facilitates delivery of an ideal sample for scanning electron microscopy.

The basic principles, main features and advantages of the present disclosure are shown and described above. It should be understood by those skilled in the art that the present disclosure is not limited by the foregoing examples, the descriptions in the foregoing examples and the specification are merely illustrative of the principles of the present disclosure, various changes and improvements will be made in the present disclosure without departing from the spirit and scope of the present disclosure, and all these changes and improvements fall within the scope of the present disclosure.

The invention claimed is:

1. An automatic sample preparation device for sampling filter membranes of ambient air particulate matter, comprising an air particulate matter sampler and a cutter, wherein the cutter comprises a second conical tube; an upper surface of the second conical tube is provided with an air inlet, the air inlet is communicated with inside of the second conical tube, an inner top surface of the second conical tube is provided with a sliding groove, the sliding groove is located outside the air inlet, and a mounting frame is fixedly arranged on an arc-shaped surface of the second conical tube; sliding rods are symmetrically and fixedly arranged on an inner wall of the mounting frame, a sliding block is movably arranged on either of the sliding rods, an elliptical frame is fixedly arranged on tops of the two sliding blocks, and the elliptical frame is located above the mounting frame; a traction plate is fixedly arranged on the elliptical frame, and a traction rod is fixedly arranged on the traction plate, wherein one end of the traction rod movably penetrates inside of the second conical tube, a screening box is fixedly arranged at the other end of the traction rod, and the screening box and the sliding groove are movably arranged; the air inlet is located above the screening box, a drainage block is fixedly arranged on a side surface of the screening box, and a discharging block is fixedly arranged at an end of the drainage block, wherein the drainage block is triangular, the drainage block is tilted downward in a direction of facing the discharging block, and screening holes are formed in the screening box;

two traction racks are fixedly arranged on symmetrical inner walls of the elliptical frame, a fixing frame is fixedly arranged at a bottom of the mounting frame, and an operating motor is fixedly arranged on the fixing frame, wherein a rotating rod is fixedly arranged at an output end of the operating motor, and the rotating rod movably penetrates the fixing frame; a sector gear is fixedly arranged on a top of the fixing frame, the sector gear is located between the two traction racks, and the sector gear is in toothed engagement with only one of the traction racks separately;

a traction tube is fixedly arranged on the second conical tube, a vertical block is fixedly arranged at one end of the traction tube, the vertical block is located inside the second conical tube, and a vertical tube is fixedly arranged at the other end of the traction tube, wherein the vertical tube is located on one side of the second conical tube, and the traction tube is tilted upward in a direction of facing the vertical block; an internal threaded cap is fixedly arranged at a bottom of the vertical tube, and a collecting bottle is threadedly arranged on the internal threaded cap;

a placing opening is formed on a top of the vertical block, the placing opening is communicated with inside of the vertical block, and inner cavities are symmetrically arranged on the vertical block, wherein the inner cavities are located on both sides of the placing opening; a mounting tube is fixedly arranged on each of the inner cavities, an insertion rod is movably arranged at an end of each of the mounting tubes, and an end of the insertion rod moves inside the mounting tube; a shielding block is fixedly arranged at an end of each of the insertion rods, the shielding block movably penetrates the placing opening, a telescopic spring is arranged on the mounting tube and the insertion rod, and both ends of the telescopic spring are fixedly arranged together with the inner cavity and the shielding block respectively; and the discharging block is located in the placing opening, and symmetrical side surfaces of the discharging block are respectively fitted with the shielding blocks.

2. The automatic sample preparation device for sampling filter membranes of ambient air particulate matter according to claim 1, wherein an internal threaded tube is fixedly arranged on the air particulate matter sampler, a threaded operating tube is fixedly arranged at a bottom of an assembly tube, the threaded operating tube is threadedly engaged with the internal threaded tube, a connecting tube is fixedly arranged on a top of the assembly tube, a first conical tube is fixedly arranged on a top of the connecting tube, a threaded sleeve is fixedly arranged on the first conical tube, and a filter membrane sheet is arranged on an inner wall of the first conical tube.

3. The automatic sample preparation device for sampling filter membranes of ambient air particulate matter according to claim 2, wherein a threaded cover is threadedly arranged on the threaded sleeve, and a filter membrane clamp is fixedly arranged on an inner wall of the threaded cover, wherein the threaded sleeve is located on an outer side of the filter membrane clamp, and a bottom of the filter membrane clamp is fitted with a surface of the filter membrane sheet; and a communicating pipe is fixedly arranged on a top of the threaded cover, a top of the communicating pipe is fixedly arranged together with a bottom of the second conical tube, a connecting rod is fixedly arranged on a top of the second conical tube, and a shielding plate is fixedly arranged on a top of the connecting rod.

4. The automatic sample preparation device for sampling filter membranes of ambient air particulate matter according to claim 3, wherein two guide plates are symmetrically and fixedly arranged on an inner wall of the second conical tube, one end of either of the two guide plates is fixedly arranged, and the other end of either the two guide plates is tilted downward outward; a mounting frame is fixedly arranged at a bottom of either of the two guide plates, a rotating rod is movably arranged on the mounting frame, and the rotating rod is located inside the communicating pipe and the threaded cover; and a plurality of push plates are fixedly arranged on the rotating rod, and the push plates are close to the filter membrane sheet.

5. The automatic sample preparation device for sampling filter membranes of ambient air particulate matter according to claim 4, wherein a first equal-diameter bevel gear is fixedly arranged on a top of the rotating rod, and a movable rod is movably arranged on the second conical tube; a second equal-diameter bevel gear is fixedly arranged at one end of the movable rod, the second equal-diameter bevel gear is located below the guide plates, and the second equal-diameter bevel gear is in toothed engagement with the first equal-diameter bevel gear; and a third equal-diameter bevel gear is fixedly arranged at the other end of the movable rod, a fourth equal-diameter bevel gear is fixedly arranged on the rotating rod, and the fourth equal-diameter bevel gear is in toothed engagement with the third equal-diameter bevel gear.

\* \* \* \* \*